Nov. 9, 1965

J. D. KELLER 3,216,315

DIFFRACTION GRATING HAVING PROGRESSIVELY INCREASING
BLAZE ANGLE AND APPARATUS THEREFOR

Filed Dec. 26, 1961

INVENTOR.
JOHN D. KELLER
BY
ATTORNEYS 3,216,315
DIFFRACTION GRATING HAVING PROGRES-
SIVELY INCREASING BLAZE ANGLE AND
APPARATUS THEREFOR
John D. Keller, Greece, N.Y., assignor to Bausch & Lomb
Incorporated, Rochester, N.Y., a corporation of New
York
Filed Dec. 26, 1961, Ser. No. 161,950
7 Claims. (Cl. 88—14)

This invention relates to a light dispersing means and more particularly to a diffraction grating adapted for dispersion of infrared light.

The monochromator operating in the visible spectrum requires dispersion of a wavelength range in the ratio of approximately 2 to 1. In the field of infrared light a new problem is encountered due to the fact that a wider range of wavelengths is dispersed throughout the infrared spectrum. The ratio of wavelengths is approximately 100 to 1, in other words the longest wavelengths are equal to almost 100 times the shortest wavelengths in the infrared spectrum. Consequently this presents a problem in providing maximum efficiency for all wavelengths of infrared spectrums.

The groove face width, of a diffraction grating on which the light is incident should not be substantially less than the longest wavelength. Assuming the desired order of dispersion and the number of ruled lines for given wavelength is known, the blaze angle may be calculated. In order that maximum efficiency is provided throughout the infrared spectrum, or portion of the spectrum, this invention proposes adjacent sections on a diffraction grating being blazed at the different angles. A device is also provided for feeding the diffraction grating into the radiant flux to provide maximum efficiency of the system over wide wavelength ranges in the infrared spectrum.

It is an object of this invention to provide a diffraction grating with a different blaze angle on adjacent sections of the diffraction grating.

It is another object of this invention to provide a progressively increasing diffraction grating blaze angle on adjacent sections across the ruled surface of a grating to provide maximum efficiency over wide wavelength ranges.

It is a further object of this invention to control the blaze angle on the groove faces in adjacent sections of the grating so that groove faces are angularly inclined to groove faces in adjacent sections thereby providing a steeper angle for increase in wavelengths.

It is a further object of this invention to provide a diffraction grating for maximum efficiency in the desired order of diffraction over wide wavelength ranges.

It is a further object of this invention to provide a supporting and driving mechanism to accommodate the changing wavelength.

The objects of this invention are accomplished by ruling the surface of the reflectance grating with adjacent sections blazed at a different angle to each other. The blaze angle is small on the one side of the diffraction grating and progressively increases from one section to another across the face of the grating whereby a steeper face is provided on the groove faces in the last section of the grating. The changing of the face angle of the groove provides for maximum energy in the desired order as the wavelength changes.

The diffraction grating is mounted on a pivotal arm connected to a drive mechanism which changes the wavelength linearly. The blaze angle and the arm angle are equal at the wavelength of maximum efficiency for each of the differently blazed portions of the grating and the drive movement is a sine function of the angle of rotation of the plane of the grating face.

A multi-stage filter is also connected to the linear drive mechanism and covers the entrance slit on the monochromator with successive filter blocks to eliminate unwanted interfering orders of the spectrum from entering the entrance slit of the monochromator. Both entrance and exist slit may be driven in such a way as to provide a constant wave number band pass.

The following figures illustrates the preferred version of the diffraction grating and the supporting and operating mechanism. Various modifications might be devised falling within the spirit of the invention of which a preferred version is illustrated in the following figures.

Figure 1:
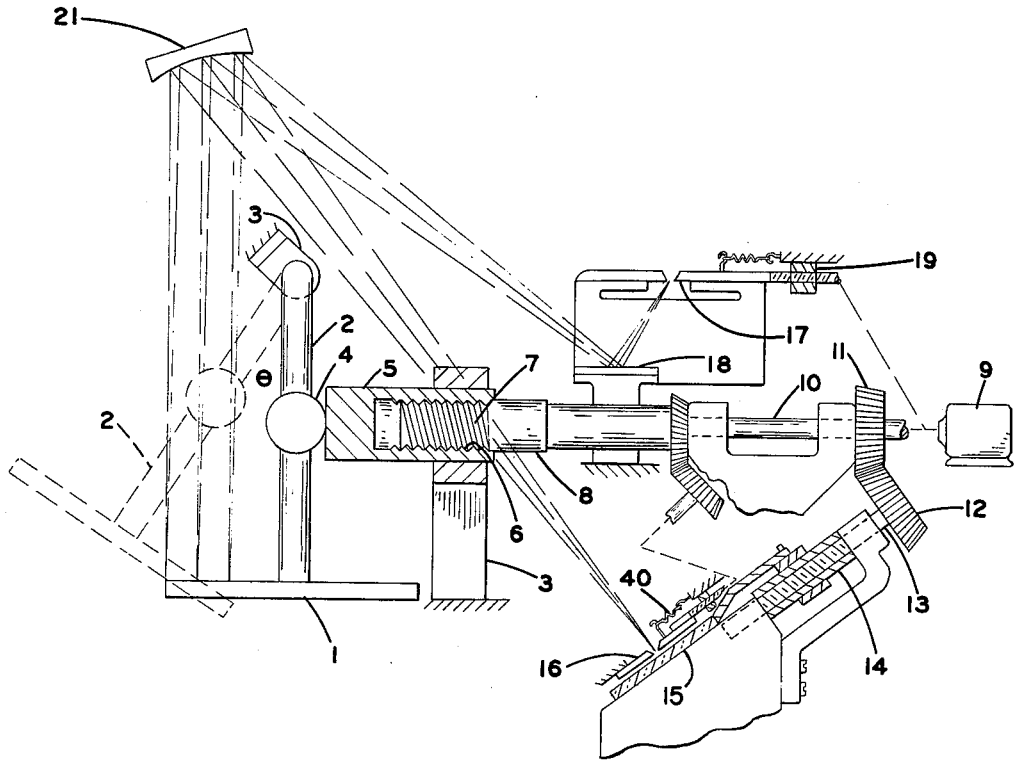
FIG. 1 illustrates a drive mechanism for operating in conjunction with a diffraction grating.

The device as illustrated in FIG. 1 discloses a diffraction grating 1 mounted on a pivoting arm 2 which is pivotally supported on the mounting 3. The arm 2 supports a roller 4 on the intermediate portion which engages the sleeve 5. The sleeve 5 is slidably mounted on the mounting 3. The forward end of the sleeve 5 engages the roller 4 and pivots the diffraction grating 1 upon operation of the drive mechanism. The inner periphery of the sleeve 5 contains a threaded portion 6 which threadingly engages the thread 7 of the push rod 8. The push rod 8 extends rearwardly to form a portion of the shaft 10 in a motor 9 which operates the mechanism.

The motor 9 as illustrated is connected to the shaft 10 which carries a bevel gear 11 meshed with a mating bevel gear 12. The bevel gear 12 is connected to the shaft 13 which threadingly engages the collar 14. The collar 14 is connected to the filter 15 for reciprocal movement of the filter across the entrance slit 16. The source of illumination not shown impinges on the slit 16 subsequent to passing through a filter 15.

The exit slit 17 transmits the light beam from the monochromator after the beam has been reflected by the mirror 18. (An adjusting means 19 is connected to the drive mechanism and shaft 10 to provide a drive means for adjustment of the exit slit.) An adjusting means 40 is also connected to the drive mechanism for adjustment of the entrance slit. The input beam is transmitted through the entrance slit 16 and impinges on the collimator 21. The collimator 21 collimates the light beam and reflects the beam on the grating 1. The beam is diffracted by the grating 1 and is directed on the collimator 21 which converges the beam on the mirror 18. The mirror 18 reflects the beam where it impinges on the exit slit 17 prior to exit from the monochromator.

Figure 2:
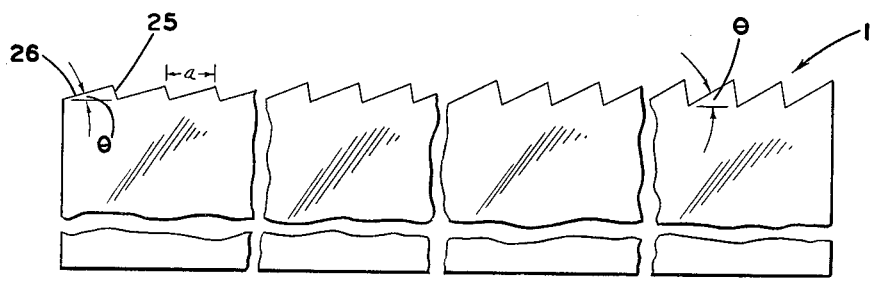
FIG. 2 is an enlarged cross section view of the diffraction grating illustrating four sections each having a changing face angle on the grooves of the diffraction grating.

Referring to FIG. 2 the diffraction grating 1 is illustrated in an enlarged view showing the four sections of the grating. The grating is enlarged to illustrate a cross section of the plurality of grooves formed on the ruled surface of the grating. The ruled surface is formed by grooves having two planar faces positioned at an angle relative to each other. The narrow face 25 forms a steep angle with the grating. The wide face 26 forms a small angle with the grating. Two surfaces 25 and 26 form a groove in the surface of the grating. The angle $\theta$ is formed intermediate the face 26 and a plane parallel with the grating. The angle $\theta$ is known as the blaze angle for the wide face 26 of the diffraction grating. This blaze angle is ruled for maximum energy of the diffracted light throughout the wavelength range intended for each of the differently blazed sections of the grating. The width of the reflecting groove face should not be substantially less than the longest wavelength for the calculated wavelength range. In view of the fact that the infrared portion of the spectrum is so wide a single blaze angle grating cannot provide adequate energy over the full range.

Accordingly, this invention provides a changing blaze angle in the adjoining section of the grating to accommodate the changing wavelengths in the infrared spectrum. Each section is used only for its maximum energy output. As the energy output of a section begins to decrease the adjoining section is moved into operation. FIG. 2 illustrates the gradual increase in the angle ($\theta$) from left to right in the four sections illustrating the grooves on the ruled surface of the grating. The wavelength ($\lambda$) being known the angle ($\theta$) may be calculated as follows by the standard grating formula, $$(a) \sin \theta = m\lambda$$

where $m$ = the spectral order and $\lambda$ = the wavelength and $(a)$ is the total groove width on a horizontal linear dimension.

Referring to FIG. 1 the view illustrates that there is a definite relationship between the pivoting mechanism and the linear drive mechanism operating the diffraction grating. The angle $\theta$ is the included angle between the phantom view of the arm 2 and the arm in the solid line view showing the retracted position. The linear movement of the drive mechanism on the arm is equal to the sine of $\theta$ times the length of the arm. In other words the linear movement is in direct proportion to the wavelength of light. As the arm is moved by the linear drive mechanism the filter 15 also moves linearly to eliminate interfering orders prior to entrance at the entrance slit 16. The intensity of the exit beam through the exit slit 17 is also controlled in a manner to provide a constant intensity emerging from the output slit 17 in the monochromator.

The diffraction grating as illustrated provides a changing blaze angle which changes in relation to the wavelength passing through the diffraction system. The diffraction grating by having a changing blaze angle provides the maximum efficiency of light transmission in desired spectral order. In this manner a monochromator employing infrared lighting may be used over a widtr wavelength band than previously possible.

The device as illustrated and described is a preferred embodiment of this invention. Other devices may be devised within the spirit of the invention of which the following is claimed.

I claim:

1. A monocromator comprising, an entrance slit receiving radiant flux, a multistage filter filtering the incoming radiant flux, a diffraction grating diffracting said radiant flux, a collimator means collimating said radiant flux and directing said flux on said diffraction grating, a plurality of sections in said diffraction grating, each of said sections having a blaze angle of increasing magnitude relative to the preceding section to provide maximum energy output over a range of wavelengths, an exit slit receiving the dispersed flux, adjustable means controlling the opening of said entrance and exit slits, a drive means connected to said multistage filter, said diffraction grating, and said exit slit and said entrance slit to control the intensity and dispersion of the radiant flux passing through said monochromator means.

2. A monochromator comprising an entrance slit for receiving a radiant flux and having a multistage filter to eliminate unwanted interfering orders of diffracted light, a multi-section diffraction grating having sections blazed at a different angle than the preceding section to concentrate the maximum energy in the desired order of dispersion, a collimator means receiving the radiant flux from said entrance slit and directing a collimated radiant flux on said diffraction grating, a drive means, a pivotal arrangement pivotally supporting said diffraction grating connected to the drive means, an adjustable entrance slit and an adjustable exit slit controlling the intensity of the light passing through said monochromator, the drive means driving said multistage filter, said pivotal support for said diffraction grating and said adjustable slits to correlate the drive means with the wavelength change thereby controlling the dispersion of said radiant flux and the intensity of flux emitted from said monochromator.

3. A diffraction grating having a ruled surface including, a plurality of ruled sections each constructed for maximum efficiency of a portion of wavelengths throughout a wavelength range, a plurality of grooves in each of said sections having a common groove shape, at least one groove face in each of said grooves of any section forming common blaze angles, said groove faces in adjacent sections forming a progressively increasing blaze angle relative to the preceding section to thereby provide maximum efficiency of successive portions of wavelenths throughout a wavelength range.

4. A diffraction grating having a ruled surface including, a plurality of ruled sections each constructed for maximum energy of a portion of wavelength throughout a wavelength range, a plurality of grooves in each of said sections having a common groove shape, a groove face in each of said grooves constructed and arranged in common blaze angles in any section, each of said groove faces angularly disposed relative to said groove faces in adjoining sections to thereby provide maximum energy of all wavelengths throughout a wavelength range.

5. A monochromator system comprising, a diffraction grating, means directing a radiant flux on said diffraction grating, said grating including a plurality of sections in parallel and adjoining relation on the ruled surface of said grating to more effectively accommodate portions of wavelengths of a wavelength range, a plurality of grooves having a common groove shape in each of said sections, a groove face in each of said grooves constructed and arranged in common blaze angles in any section, each of said groove faces angularly disposed to said groove faces in adjoining sections, supporting means pivotally supporting said grating and producing relative motion of the grating surface receiving incident radiant flux and provide maximum efficiency throughout the wavelength range.

6. An echelette diffraction grating element for a monochromator which element is rotatable about a fixed axis and has grooves thereon which are parallel to said axis, the said grooves being disposed in a plurality of separate diffracting areas of the element, each with its own groove spacing, the groove spacing in any given area being constant, the said diffracting areas being disposed in substantially the same or parallel planes and disposed adjacent to one another in a direction perpendicular to said fixed axis, each diffracting area being used for a different region of the whole wavelength range to be covered by the element which range is effectively covered by the individual diffracting areas used in a chosen sequence, the blaze angle for any given area being chosen to give maximum energy at a wavelength lying within the wavelength region covered by the use of said area.

7. An echelette diffraction grating element for a monochromator which element is rotatable about a fixed axis and has grooves thereon which are parallel to said axis, the said grooves being disposed in a plurality of separate diffracting areas of the element each with its own groove spacing, the groove spacing in any given area being constant, the said diffracting areas being disposed in substantially the same or parallel planes and disposed adjacent to one another in a direction perpendicular to said fixed axis, each diffracting area being used for a different region of the whole wavelength range to be covered by the element, consecutive diffracting areas starting from one end of the element being used for consecutive regions of the said wavelength range, the blaze angle for any given area being chosen to give maximum energy at a wavelength lying within the wavelength region covered by the use of said area.

References Cited by the Examiner
UNITED STATES PATENTS

| | | | |
|---|---|---|---|
| 2,654,287 | 10/53 | Luft | 88—14 |
| 2,914,987 | 12/59 | Crosswhite et al. | 88—14 |
| 2,948,185 | 8/60 | Ward et al. | 88—14 |
| 2,995,973 | 8/61 | Barnes et al. | 88—14 |
| 3,020,794 | 2/62 | Reichel | 88—14 |
| 3,045,532 | 7/62 | Staunton | 88—14 |
| 3,062,089 | 11/62 | Martin | 88—14 |

JEWELL H. PEDERSEN, *Primary Examiner.*